US012614976B2

(12) United States Patent
Liu et al.

(10) Patent No.: US 12,614,976 B2
(45) Date of Patent: Apr. 28, 2026

(54) SYSTEMS AND METHODS FOR REDUCING ELECTROMAGNETIC INTERFERENCE IN ROBOTIC DEVICES

(71) Applicant: ABB Schweiz AG, Baden (CH)

(72) Inventors: Liming Liu, Cary, NC (US); Shanghua Li, Västerås (SE); Zach Z. Pan, Cary, NC (US); Yu Zhang, Tallahassee, FL (US)

(73) Assignee: ABB Schweiz AG, Baden (CH)

( * ) Notice: Subject to any disclaimer, the term of this patent is extended or adjusted under 35 U.S.C. 154(b) by 328 days.

(21) Appl. No.: 18/549,013

(22) PCT Filed: Mar. 5, 2021

(86) PCT No.: PCT/IB2021/051871
§ 371 (c)(1),
(2) Date: Sep. 5, 2023

(87) PCT Pub. No.: WO2022/185104
PCT Pub. Date: Sep. 9, 2022

(65) Prior Publication Data
US 2024/0154524 A1     May 9, 2024

(51) Int. Cl.
H02M 1/44 (2007.01)
H02M 1/12 (2006.01)
H02M 1/42 (2007.01)

(52) U.S. Cl.
CPC .............. H02M 1/44 (2013.01); H02M 1/123 (2021.05); H02M 1/4208 (2013.01)

(58) Field of Classification Search
CPC .......... H02M 1/14; H02M 1/44; H02M 1/123; H02M 1/4208; H02M 5/458; H02M 7/493; H02M 7/5387; H02M 7/5395; H02M 1/12
See application file for complete search history.

(56) References Cited

U.S. PATENT DOCUMENTS

| | | | | | |
|---|---|---|---|---|---|
| 5,956,246 A | * | 9/1999 | Sequeira | ................. | H02M 1/12 |
| | | | | | 363/144 |
| 9,658,084 B2 | * | 5/2017 | Jonsson | ................. | G01D 5/204 |

(Continued)

FOREIGN PATENT DOCUMENTS

| | | | | |
|---|---|---|---|---|
| JP | 2007336634 A | * | 12/2007 | |
| WO | WO-2020195552 A1 | * | 10/2020 | ................ H02P 5/74 |

OTHER PUBLICATIONS

Machine Translation JP-2007336634-A (Year: 2007).*

(Continued)

*Primary Examiner* — Thienvu V Tran
*Assistant Examiner* — Yahveh Comas Torres
(74) *Attorney, Agent, or Firm* — Fitch Even Tabin & Flannery LLP

(57) ABSTRACT

A robotic device for reducing electromagnetic interference (EMI) noise and suppress leakage current is provided. The robotic device comprises a controller configured to control phase-shift switching of a plurality of axes to reduce electromagnetic interference (EMI) noise and suppress leakage current, an electrical circuit, and a plurality of loads coupled to a plurality of motors of the plurality of axes. The electrical circuit comprises a power source and rectifier; an EMI filter configured to further reduce the EMI noise and suppress the leakage current from the plurality of axes; and the plurality of axes comprising a plurality of drives and a plurality of motors that are configured to operate the plurality of loads.

18 Claims, 11 Drawing Sheets

(56) References Cited

U.S. PATENT DOCUMENTS

| | | | | |
|---|---|---|---|---|
| 9,837,952 | B1 * | 12/2017 | Carcia | H02P 27/08 |
| 9,914,216 | B2 * | 3/2018 | Jonsson | B25J 9/1656 |
| 10,979,014 | B2 * | 4/2021 | Taniguchi | H02M 7/003 |
| 2004/0196677 | A1 | 10/2004 | Zhang et al. | |
| 2013/0264872 | A1 * | 10/2013 | Tago | H02M 7/003 |
| | | | | 307/31 |
| 2015/0318103 | A1 * | 11/2015 | Rozman | H02M 7/2173 |
| | | | | 336/212 |
| 2016/0329841 | A1 * | 11/2016 | Tagashira | H02P 3/18 |
| 2017/0207763 | A1 * | 7/2017 | Li | H02P 27/06 |
| 2018/0241324 | A1 * | 8/2018 | Li | H02P 5/00 |
| 2019/0363600 | A1 * | 11/2019 | Matsumoto | H02K 3/42 |

OTHER PUBLICATIONS

Machine Translation WO_2020195552 (Year: 2020).*
European Patent Office, International Search Report in International
Patent Application No. PCT/IB2021/051871, 5 pp. (Nov. 5, 2021).
European Patent Office, Written Opinion in International Patent
Application No. PCT/IB2021/051871, 7 pp. (Nov. 5, 2021).

* cited by examiner

<u>100</u>

138

140    142

130    132

Load
168

174

Power Source,
Rectifier, LISN
102, 104, 106

162

140    142

134

Load
170

176

164

140    142

136

Load
172

178

100

100

200

200

400

Figure 5:
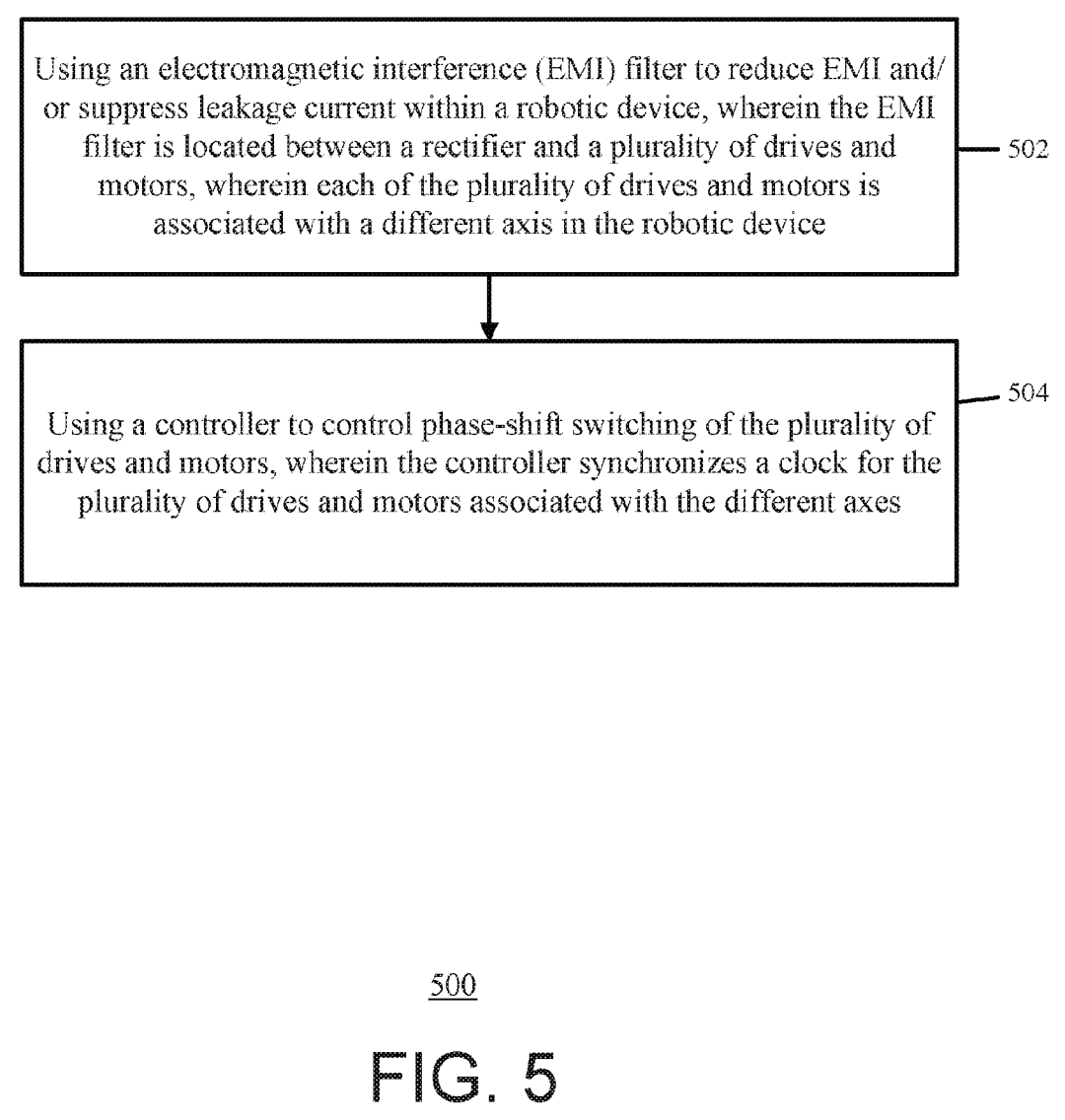

Using an electromagnetic interference (EMI) filter to reduce EMI and/ or suppress leakage current within a robotic device, wherein the EMI filter is located between a rectifier and a plurality of drives and motors, wherein each of the plurality of drives and motors is associated with a different axis in the robotic device ⎯ 502

Using a controller to control phase-shift switching of the plurality of drives and motors, wherein the controller synchronizes a clock for the plurality of drives and motors associated with the different axes ⎯ 504

SYSTEMS AND METHODS FOR REDUCING ELECTROMAGNETIC INTERFERENCE IN ROBOTIC DEVICES

FIELD

The present disclosure relates to robotic and/or automated devices and, more particularly, to systems and methods for reducing electromagnetic interference and suppressing leakage current within robotic devices using filters.

BACKGROUND

Traditionally, electromagnetic interference (EMI) may be a bottleneck to achieve a robotic device (e.g., an automated device) with distributed motor drives (e.g., multiple axes drives) when high switching devices (e.g., silicon (Si) COOLMOS, Gallium Nitride (GaN), and Silicon Carbide (SiC) devices) are used to improve system power density and efficiency, especially for high voltage applications (e.g., applications using over 400 Volts (V) of direct current (DC)). Moreover, the EMI issue may further be complicated within the robotic device with multiple axes where each axis includes an integrated motor drive. The EMI noise is not only circulating in each axis, but also flowing and expanding through multiple axes. The EMI noise interaction among multiple axes may cause serious system reliability issues.

Additionally, and/or alternatively, leakage current (e.g., any current that flows when the ideal current is zero) may also be a big concern especially when considering system safety requirements within robotic devices. For instance, due to the parasitic nature of the drive, motor, bus, cables, and so on in multiple axes, there are significant amounts of leakage current flows from the motor/drive to the front-end rectifier power module if devices on the motor/drives have a high switching speed. As a result, leakage current on the front-end rectifier power module may be a concern, especially for these applications with a 3.5 milliampere (mA) leakage current limitation requirement. In some instances, big multi-stage EMI filters that are located on the AC end (e.g., between the motors and the load) have been used to reduce the EMI noise, but this increases the cost, weight, and takes more space within the robotic device, which reduces the payload capability. Accordingly, there remains a technical need to provide a system and method to reduce EMI and suppress the leakage current within robotic devices.

SUMMARY

A first aspect of the present disclosure provides a robotic device comprising a controller configured to control phase-shift switching of a plurality of axes to reduce electromagnetic interference (EMI) noise and suppress leakage current, an electrical circuit, and a plurality of loads coupled to the plurality of motors of the plurality of axes, wherein each of the plurality of loads maneuvers the robotic device in a different rotational or linear direction. The electrical circuit comprises a power source and rectifier that are configured to provide energy to the plurality of axes of the robotic device, wherein each of the plurality of axes includes a motor and a drive that is configured to operate a load, and wherein the power source and the rectifier are electrically coupled to an EMI filter; the EMI filter, wherein the EMI filter is configured to further reduce the EMI noise and suppress the leakage current from the plurality of axes, and wherein the EMI filter is electrically coupled to the plurality of axes such that the EMI filter is between the rectifier and the plurality of axes; and the plurality of axes comprising a plurality of drives and a plurality of motors that are configured to operate a plurality of loads.

According to an implementation of the first aspect, the EMI filter comprises a plurality of small split common mode chokes, wherein each of the plurality of small split common mode chokes is associated with a different axis of the plurality of axes.

According to an implementation of the first aspect, the robotic device further comprises an electrical bus electrically coupled to the power source and the rectifier; and a plurality of individual connections that electrically couples the electrical bus to the plurality of axes, wherein each of the plurality of individual connections electrically couples the electrical bus to a different axis of the plurality of axes. Each of the plurality of small split common mode chokes is positioned on a different individual connection of the plurality of individual connections.

According to an implementation of the first aspect, the EMI filter further comprises a bus filter, wherein the bus filter is positioned on the electrical bus. According to an implementation of the first aspect, the bus filter comprises a second small split common mode choke and one or more Y capacitors.

According to an implementation of the first aspect, the bus filter further comprises one or more X capacitors.

According to an implementation of the first aspect, the bus filter is a multi-stage EMI filter that comprises a common EMI filter at a first stage and at least one small common mode choke at a second stage.

According to an implementation of the first aspect, the EMI filter further comprises a plurality of Y capacitors, wherein a subset of the plurality of Y capacitors is associated with a different axis of the plurality of axes.

According to an implementation of the first aspect, the subset of the plurality of Y capacitors is electrically coupled to a small split common mode choke, of the plurality of small split common mode chokes, and the small split common mode choke is electrically coupled to a first axis, of the plurality of axes such that the small split common mode choke is in-between the subset of the plurality of Y capacitors and the first axis.

According to an implementation of the first aspect, the controller is further configured to synchronize clocks for the plurality of axes.

According to an implementation of the first aspect, a power earth, wherein the plurality of axes are connected to the power earth at a single point.

According to an implementation of the first aspect, the power source is an alternative current (AC) power source and the rectifier converts AC energy from the power source to DC energy. The EMI filter is configured to receive the DC energy from the rectifier and provide the DC energy to the plurality of axes.

A second aspect of the present disclosure provides an electrical circuit comprising: a power source and rectifier that are configured to provide energy to a plurality of axes, wherein each of the plurality of axes includes a motor and a drive that is configured to operate a load, and wherein the power source and the rectifier are electrically coupled to an electromagnetic interference (EMI) filter; the EMI filter, wherein the EMI filter is configured to reduce EMI noise and suppress leakage current from the plurality of axes, and wherein the EMI filter is electrically coupled to the plurality of axes such that the EMI filter is between the rectifier and the plurality of axes; and the plurality of axes comprising a plurality of drives and a plurality of motors that are configured to operate a plurality of loads. A controller is configured to control phase-shift switching of the plurality of axes to further reduce the EMI noise and suppress the leakage current.

According to an implementation of the second aspect, the EMI filter comprises a plurality of small split common mode chokes, wherein each of the plurality of small split common mode chokes is associated with a different axis of the plurality of axes.

According to an implementation of the second aspect, the electrical circuit further comprises an electrical bus electrically coupled to the power source and the rectifier; and a plurality of individual connections that electrically couples the electrical bus to the plurality of axes, wherein each of the plurality of individual connections electrically couples the electrical bus to a different axis of the plurality of axes. Each of the plurality of small split common mode chokes is positioned on a different individual connection of the plurality of individual connections.

According to an implementation of the second aspect, the EMI filter further comprises a bus filter, wherein the bus filter is positioned on the electrical bus.

According to an implementation of the second aspect, the bus filter comprises a second small split common mode choke and one or more Y capacitors.

According to an implementation of the second aspect, the bus filter further comprises one or more X capacitors. According to an implementation of the second aspect, the EMI filter further comprises a plurality of Y capacitors, wherein a subset of the plurality of Y capacitors is associated with a different axis of the plurality of axes.

A second aspect of the present disclosure provides a method comprising controlling, by a controller of a robotic device, phase-shift switching of a plurality of axes to reduce electromagnetic interference (EMI) noise and suppress leakage current; and using, by an electrical circuit of the robotic device, an EMI filter to further reduce the EMI noise and suppress the leakage current from the plurality of axes. The electrical circuit comprises a power source, a rectifier, the EMI filter, and the plurality of axes. The EMI filter is electrically coupled to the plurality of axes such that the EMI filter is between the rectifier and the plurality of axes.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following:

FIG. 5 depicts an exemplary process for using the EMI filter of FIG. 2 to reduce the EMI and/or suppress the leakage current according to one or more embodiments of the present disclosure.

DETAILED DESCRIPTION

Figure 1A:
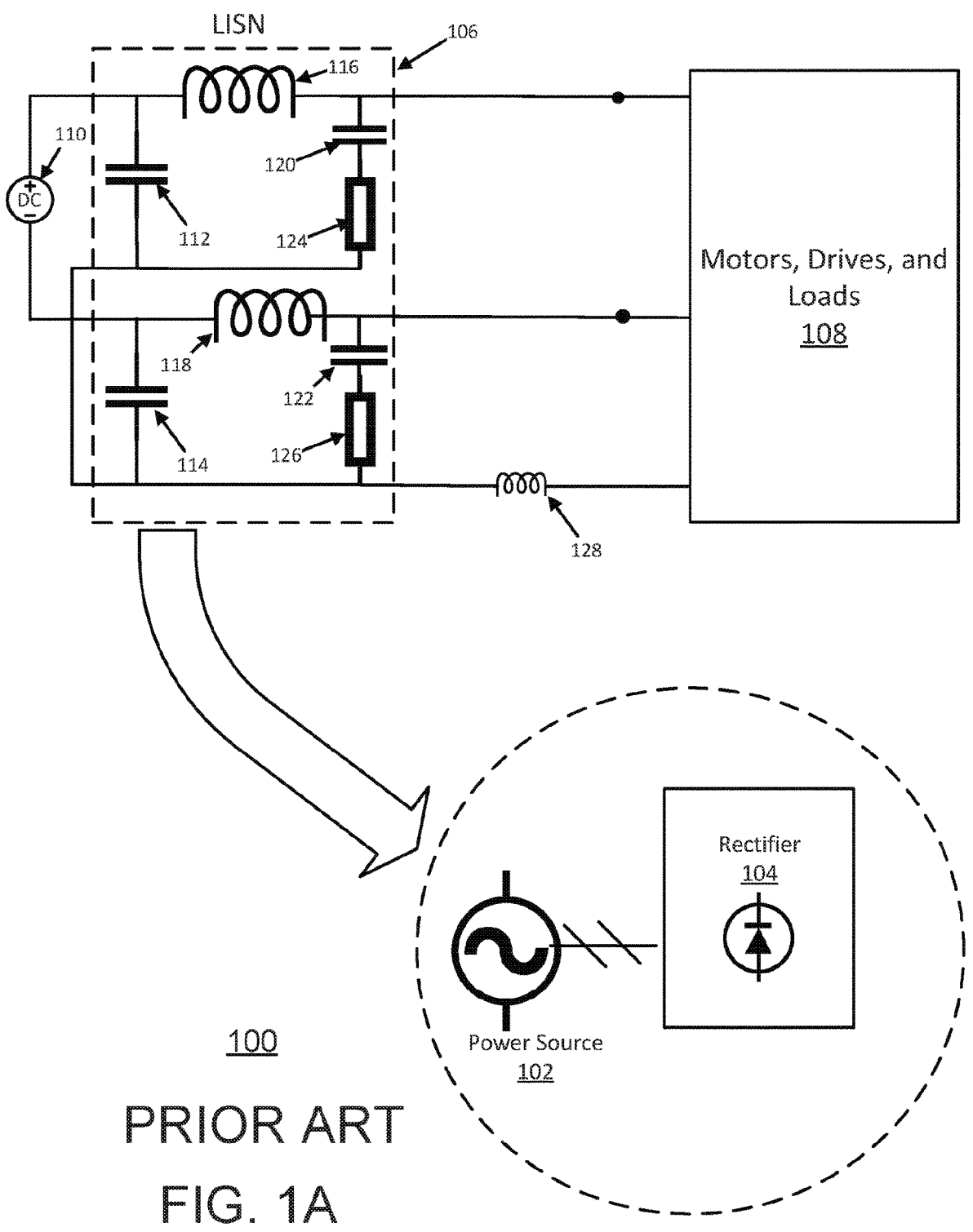
FIGS. 1A-1D illustrate traditional circuit and block diagrams depicting a robotic device with multiple axes of motors and drives according to one or more embodiments of the present disclosure.

As discussed above, electromagnetic interference (EMI) may be a bottleneck for optimizing a robotic device with distributed motor drives when high switching devices are used to improve the robotic device's power density and efficiency. Leakage current may further be a concern considering system safety requirements within the robotic device. The robotic device may be any type of device that includes one or more controllers and multiple motors and drives that are coupled to multiple loads. A load may be a robotic arm, robotic leg, and/or other component that is configured to perform actions or operations for the robotic device. For instance, in a simplified example, based on instructions from the controller, the robotic component (e.g., arm) may maneuver to a first location, pick up an object at the first location, and then drop the object in a new location. In such examples, the robotic device may include a robotic arm that first moves to the first location. Maneuvering the robotic arm to the first location may require movement in multiple different directions or different axes. For instance, the robotic arm may first need to move a certain distance on the x-axis, a certain distance on the y-axis, and/or a certain distance on the z-axis. Each motor/drive combination may be assigned to a load that assists the robotic device to maneuver in a different axis. In other words, referring to the three axes above (x, y, and z-axis), a first motor/drive may be assigned to a first load that is configured to assist the robotic arm to move in the x-axis, a second motor/drive may be assigned to a second load that is configured to assist the robotic arm to move in the y-axis, and a third motor/drive may be assigned to a third load to assist the robotic arm to move in the z-axis. Similarly, in other examples, the robotic device may be maneuvered in additional axes and a motor/drive combination may be used to each of these additional axes. For instance, an additional axis with its own load, motor, and drive may be used to rotate the hand of the robotic arm to pick up and release the object. In some other examples such as a six-axis coordinate robotic device, six different motor/drive combinations may be used. The first axis may be for rotating the robot device at the base of the robotic device, a second axis may be used for forward/back extension of the robot device's lower arm, a third axis may be used for raising/lowering the robot's upper arm, a fourth axis may be used to robotic device's upper arm, a fifth axis may be used to raise/lower the wrist of the robotic arm, and a six axis may be used to rotate the wrist of the robot's arm. Only a few of the examples of robotic devices with multiple different axes are described above solely for brevity, the problems of the traditional systems as well as the solution within the present application may be applicable to robotic devices that are capable of being maneuvered in any number of axes.

Each motor/drive/load combination may create and cause EMI and/or leakage current. As such, the more motor/drive/ load combinations are within the robotic device, the greater the EMI and leakage current. Traditionally, EMI is a bottleneck to achieve a robotic device with distributed motor drives (e.g., multiple axes) when high switching devices are used to improve the system power density and efficiency. High switching frequency is also expected to reduce current ripple, torque ripple, improve control system performance and provide more design freedom on motor parameter selection. However, it may also induce serious EMI noise. Moreover, the EMI issue is much more complicated in robotic devices with multiple axes where each axes includes an integrated motor drive. For example, the EMI noise is not only circulating in each axis, but also flowing through multiple axes, which will cause serious system reliability issues. This will be explained further in FIGS. 1A-1D below. In addition, due to the parasitic nature of drives, motors, buses, cables, and so on in multiple axes, there are amounts of leakage current flows from motor/drives to the front-end rectifier power module if devices on the motor/drive have high switching speeds. As a result, leakage current on the front-end rectifier power modules may be a big concern, especially for these applications with 3.5 mA leakage current limitation requirements.

FIGS. 1A-1D illustrate traditional and conventional circuit and block diagrams depicting a robotic device with multiple axes of motors and drives according to one or more embodiments of the present disclosure. Referring to FIG. 1A, the conventional robotic system (e.g., robotic device) 100 includes a power source 102 connected to a rectifier 104. The power source 102 may be an AC power source that is configured to provide AC electrical energy (e.g., AC current, AC voltage, and/or AC power) to the rectifier 104. The rectifier 104 may be an electrical device that converts the AC electrical energy to DC electrical energy (e.g., DC current, DC voltage, and/or DC power). This DC electrical energy from the rectifier 104 to is provided to the line impedance stabilization network (LISN) 106. The LISN 106 is a device used in conducted and radiated radio-frequency emission and susceptibility tests. The LISN 106 is typically placed between a power source (e.g., the power source 102) and an equipment under test (EUT), such as the motors/drives, to create a known impedance and/or to provide a radio frequency (RF) noise measurement port. The DC power source 110 may be and/or include the power source 102 and the rectifier 104, which as described above, is a DC power source because the rectifier 104 is configured to convert the AC electrical energy from the power source 102 to DC energy to be fed into the LISN 106.

Figure 1B:
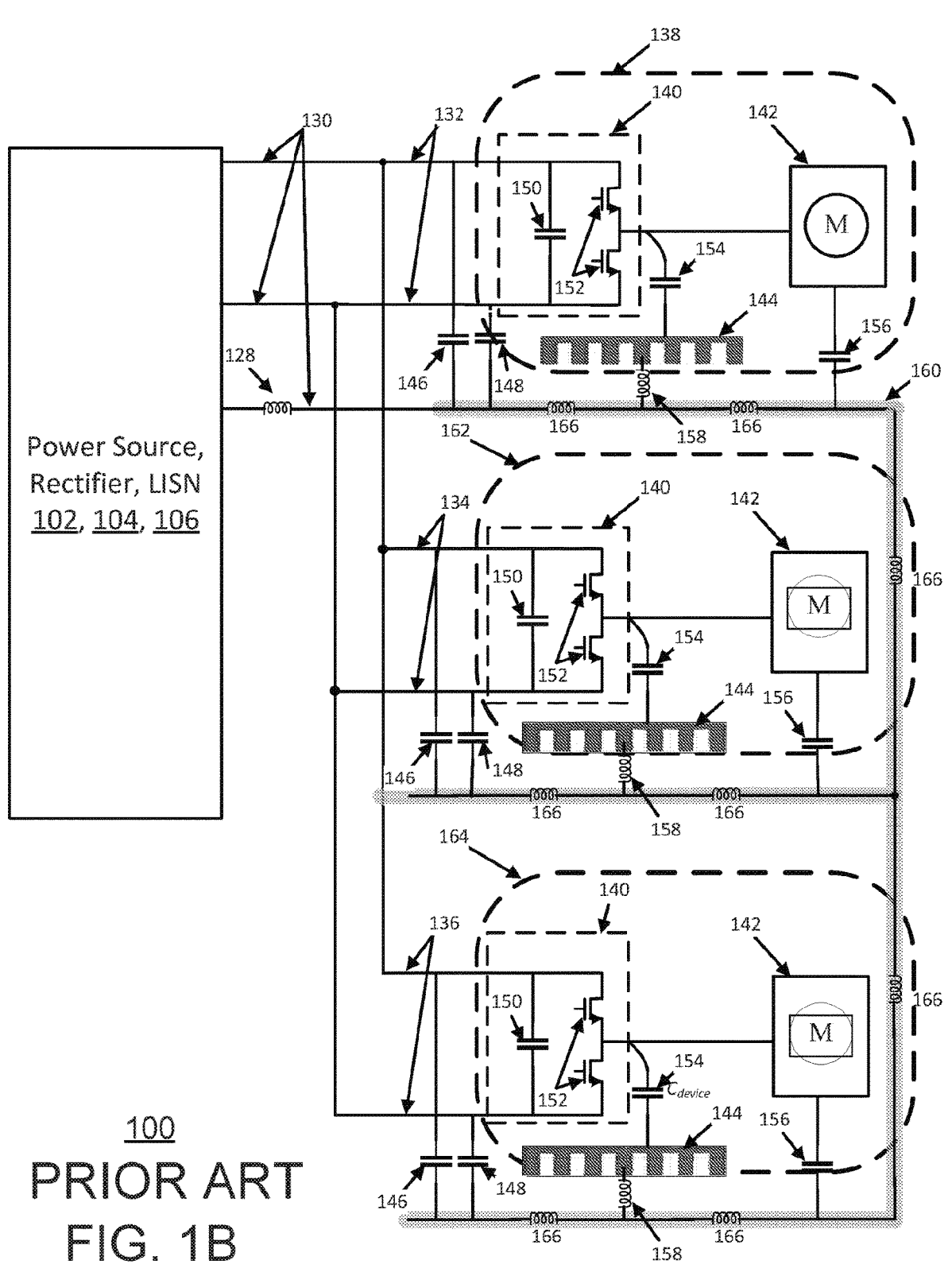

The LISN 106 includes two inductors 116 and 118, three capacitors 112, 114, and 120, and two resistors 124 and 126. The LISN 106 is coupled to the motors, drives, and loads 108. In between one of the connection lines between the LISN 106 and the motors, drives, and loads 108 is another inductor 128 (e.g., a stray inductor). FIG. 1B shows the circuit diagram for the motor and drives of element 108 from FIG. 1A.

Figure 1C:
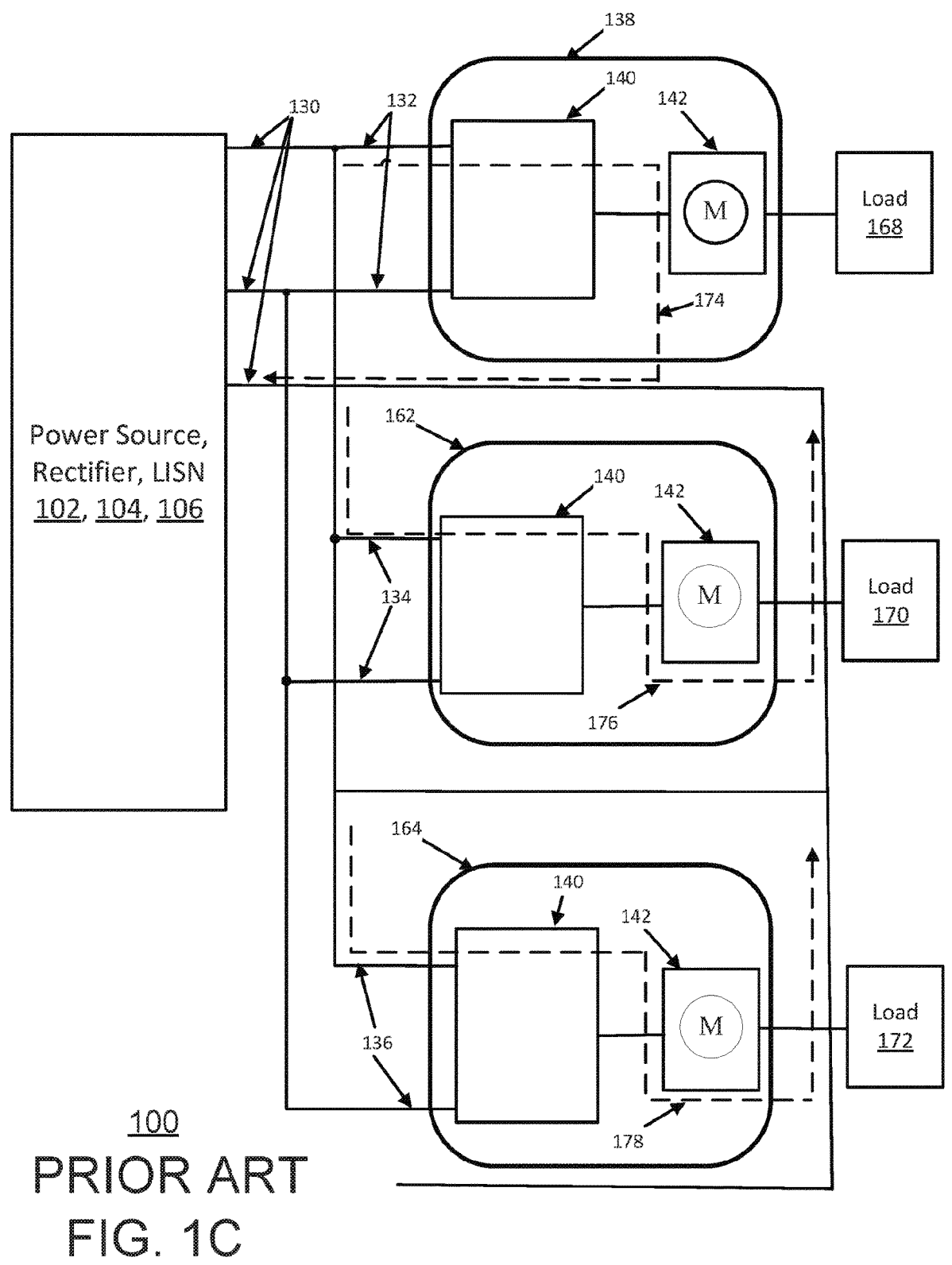
Figure 1D:
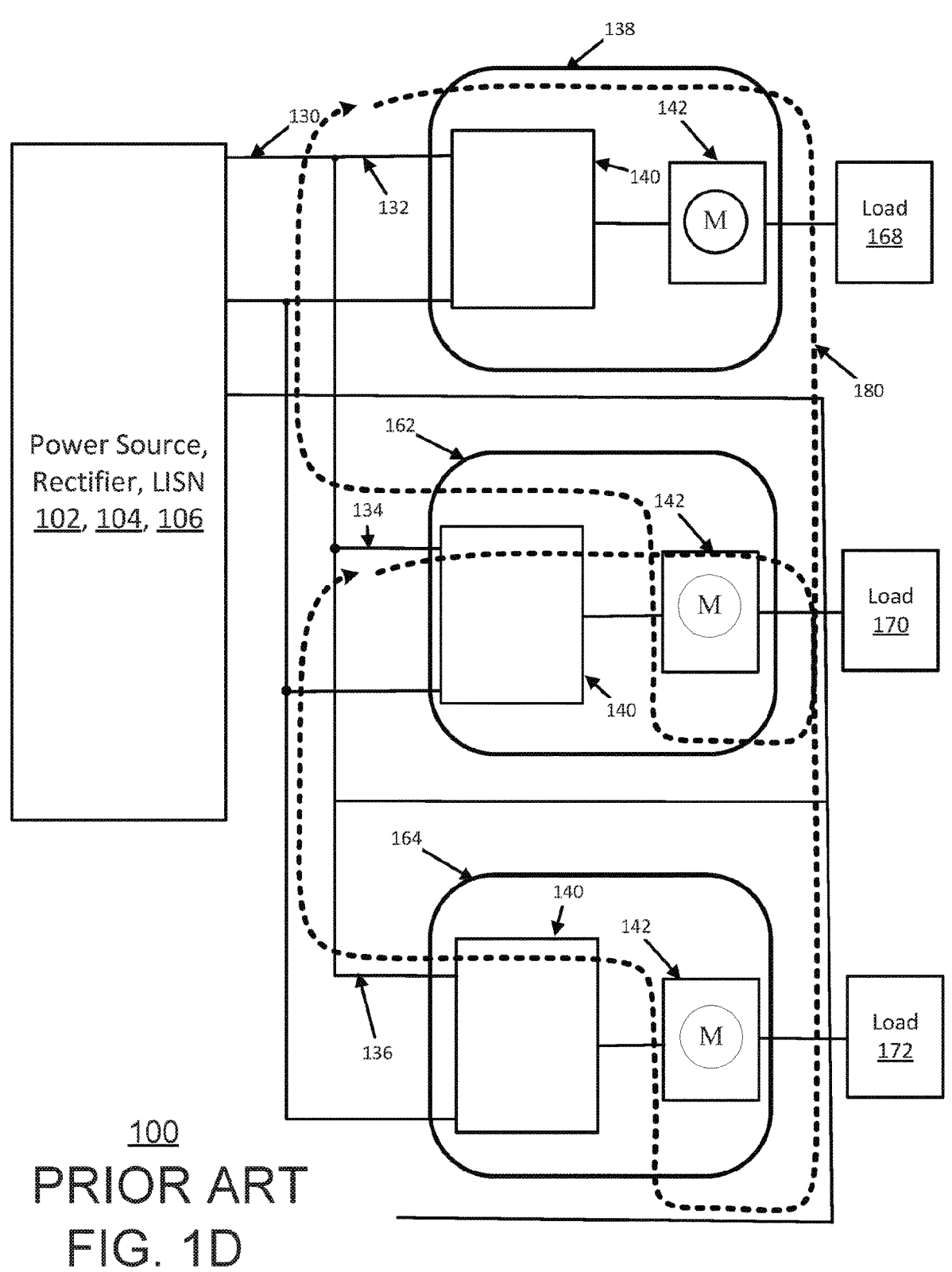

FIG. 1B shows another illustration of the robotic device 100 where the circuit elements of the motors/drives are shown and the power source 102, rectifier 104, and LISN 106 are shown as a block. Referring to FIG. 1B, the power source 102, rectifier 104, and the LISN 106 from FIG. 1A are coupled and/or connected (e.g., via wires) to the drives 140 and motors 142 within the robotic device 100. The inductor 128 from FIG. 1A is also shown in FIG. 1B. Each of the drives 140 and motors 142 are separated into a different axis. For example, the first axis 138, the second axis 162, and the third axis 164 all include a drive 140 and a motor 142. As mentioned above, the robotic device 100 may include one or more components that are capable of rotating (yaw), pitching, extending/retracting, moving to a new location, and/or other types of movements. In other words, the kinematics of the components of the robotic device 100 (as well as the robotic device 200 described below) includes rotation and/or linear movement. Each of these different types of movement may be controlled by a drive 140 and motor 142 pair. For example, the drive 140/motor 142 pair of the first axis 138 may control movement in the x direction or x-axis, the drive 140/motor 142 pair of the second axis 162 may control movement in the y direction or y-axis, and the drive 140/motor 142 pair of the third axis 164 may control movement in the z direction or z-axis. Only three axes 138, 162, and 164 are shown in FIGS. 1B-1D solely for brevity and the robotic device 100 may include fewer (e.g., two axes of drive 140/motor 142 pairs) or additional (e.g., six, ten, and/or even more) axes of drive 140/motor 142 pairs. For example, the robotic device 100 may have two robotic arms with each arm having six axes of movement. Accordingly, in such examples, the robotic device 100 may include twelve or more drive 140/motor 142 pairs that are configured for each of the different axes of movement.

Between the LISN 106 and the axes 138, 162, and 164 of the robotic device 100 are a plurality of connections (e.g., electrical wires/wiring) that are configured to provide the electrical energy from the power source 102/rectifier 104 to motors 142. For example, the connections between the LISN 106 and the axes 138, 162, and 164 include an electrical bus 130 (e.g., a DC electrical bus). The electrical bus 130 is coupled to additional connections 132, 134, and 136. The connection 132 couples (e.g., connects and/or is configured to provide energy) the electrical bus 130 to the components (e.g., the motor 142 and the drive 140) of the first axis 138. The connection 134 couples the electrical bus 130 to the components of the second axis 162. The connection 136 couples the electrical bus 130 to the components of the third axis 164.

As shown, after the connection 132, there are four parasitic capacitors 146, 148, 154, and 156 that are outside of the drive 140 and at least some of these capacitors are within the first axis 138. The four parasitic capacitors 146, 148, 154, and 156 may be capacitors that are induced by the circuit design. In other words, in some instances, parasitic capacitors and/or parasitic inductors (described below) may be capacitors/inductors that are induced by the circuit design and might not be "real" components within the robotic device. For example, these parasitic capacitors 146, 148, 154, and 156 are not real components within the robotic device 100 and may cause the EMI and leakage current issues described herein. The positive DC bus (PBus) capacitor 146 is an equivalent parasitic capacitance between the positive DC bus and power earth. The negative DC bus (NBus) capacitor 148 is an equivalent parasitic capacitance between the negative DC bus and power earth. The capacitor 154 shows an equivalent parasitic capacitance between the AC output cable and power earth. The motor capacitor 156 shows an equivalent parasitic capacitance between the chassis/frame of the motor drive and power earth. The first axis 138 also includes a parasitic inductor 158 and a parasitic capacitor 128.

The first axis 138 further includes a drive 140 and a motor 142. The first axis 138 may be used for three-phase power and the drive 140 shows a single phase of the three-phase power. In other words, a single capacitor 150 and two switches 152 of the drive 140 are shown solely for brevity and clarity and the drive 140 may include additional capacitors 150 and switches 152 for the three-phase power. The drive 140 and the first axis 138 are shown using dotted lines to indicate the components that are located within and outside of the drive 140 and the first axis 138 respectively. For example, within the drive 140 is a capacitor 150 and two switches 152. The capacitor 150 is a DC capacitor that may be used for each axis of the three-phase power. The switches 152 are semi-conductor devices that are used for the three-phase power. The drive 140 is configured to harness and control the electrical energy (from the power source 102) that is sent to the motor 142. The motor 142 is configured to generate rotational or linear force that is used to power a load (e.g., load 168, 170, 172 shown in FIGS. 1C and 1D). The first axis 138 further includes a heatsink 144. The heatsink 144 is a passive heat exchanger that transfer the heat generated by the drive 140 or motor 142 to be cooled and dissipated away from the drive 140/motor 142. Similar components are used for the second axis 162 and the third axis 164 of the robotic device 100 and function similarly to the above descriptions. Further, solely for the sake of brevity, the components used for the second and third axes 162 and 164 share similar reference numbers for similar devices/components.

The robotic device 100 further includes a frame 160 that has been shaded gray. The frame 160 includes multiple inductors 166 (e.g., stray inductors) that may be parasitic inductances between frame to frame and/or frame to power earth.

FIG. 1C shows another illustration of the robotic device 100 where the major components of the robotic device 100 (e.g., the motor 142, drive 140, axes 138, 162, and 164, the power source 102, the rectifier 104, and the LISN 106) are shown and will be used to describe the EMI and leakage current path for each axis 138, 162, 164. In addition, the electrical bus 130 and the connections 132, 134, and 136 from the bus 130 to the axes 138, 162, and 164 are also shown. Further, three loads 168, 170, and 172 are shown. The three loads 168, 170, and 172 are coupled to the motors 142 and the motors 142 may provide power to drive, operate, and/or provide other functionalities for the loads 168, 170, and 172. For example, in some instances, the motor 142 of the first axis 138 may provide power to the load 168 such that an arm of the robotic device 100 may move in a particular direction (e.g., along the x-axis). Similarly, the motors 142 of the second axis 162 and the third axis 164 may provide power to the loads 170 and 172 such that the arm of the robotic device 100 may move in other directions (e.g., along the y and z-axis).

However, as mentioned above, each of these axis with the integrated motor drives 140, 142 may cause EMI noise as well as leakage current flows. The dotted line 174 shows the EMI noise and leakage current path for the first axis 138. Likewise, the dotted lines 176 and 178 show the EMI noise and leakage current path for the second axis 162 and the third axis 164, respectively. Furthermore, the more axes the robotic device 100 has, the more EMI noise and leakage current may be generated, which causes many problems. This is described in FIG. 1D.

Referring to FIG. 1D, the cumulative EMI noise and leakage current for all three axes 138, 162 and 164 is shown by the dotted line 180. For example, the EMI noise is not only circulating in each axis, but also flowing through multiple axes (shown as dotted line 180), which will cause serious system reliability issues. The more axes are within the robotic device 100, the greater the amount of EMI noise and leakage current is within the robotic device 100. Traditionally, there are a few implementations that have been used to reduce the EMI noise and/or suppress the leakage current. For instance, in a traditional motor/drive without the front-end rectifier power module (e.g., 102/104), one typical solution is to add an EMI filter on the AC side, which is located between the drive and motor (e.g., between the drive 140 and the motor 142). In a traditional motor drive with the front-end rectifier power module, EMI filters may be added to both the AC input (e.g., before the input to the rectifier 104) and AC output ends (e.g., after the drive 140) to reduce the EMI noise. Further, an additional EMI filter may be added to the DC bus. For instance, in traditional systems, by using solely an EMI filter on the DC bus, traditional systems are unable to achieve good enough EMI reduction for certain applications. However, as will be explained below, the present application discloses combining the EMI filter on the DC bus with additional features such as by using phase-shift control to further reduce the EMI/leakage current and/or by introducing EMI filters to each axis (e.g., the split small common mode chokes 322 and 326 shown on FIG. 3). Additionally, multiple stage (e.g., 2 stage) EMI filters may also be used to reduce EMI noise, but this may increase the cost, increases the weight of the robotic device as well as takes up more space within the robotic device, and reduces the payload capability. In traditional systems, these multiple stage EMI filters are typically located between the power source 102 and the rectifier 104 in FIG. 1A and/or typically located between the drive 140 and the motor 142 in FIG. 1B.

Accordingly, as will be described in further detail below, the present application attenuates the EMI noise by adding EMI filters and/or split small common mode (CM) chokes on each axis. In some instances, the common EMI filter may be put on a common direct current (DC) bus that is close to the front-end rectifier power module and/or also put a split small CM choke on the DC terminal of each axis. Accordingly, the EMI issue in multiple different axes may be reduced from the DC side (e.g., after the output to the rectifier 104 and before the drive 140) as there is a common DC bus within the robotic device, a short DC cable among multiple axes, a short alternating current (AC) cable between the drive and motor, which is an integrated motor/drive in each axis. Moreover, leakage current may be suppressed using phase-shift switching control among the multiple axes. In such examples, there may be small leakage current from the multiple axes that goes back to the power earth (PE) terminal on the front-end rectifier power module side. As such, the safety of the robotic device/system may be enhanced.

In some examples, the EMI noise may be attenuated to be within 150 kilohertz (kHz) to 30 megahertz (MHz) by adding one common EMI filter on the common DC bus close to the front-end rectifier power module, and/or putting split small common mode (CM) chokes on the DC terminal of each axis. Therefore, it is possible to solve the EMI issue in multiple axes by using filters/components from the DC side because there is a common DC bus in the robotic device, a short DC cable among multiple axes, and a short AC cable between the drive and motor, which is integrated motor drive in each axes. Moreover, leakage current may be suppressed by simple phase-shift switching control among multiple axes. In such examples, there is very small leakage current from the multiple axes that goes back to the PE terminal on the front-end rectifier power module side. Therefore, the safety of the robotic device/system may be enhanced. The synchronizing among multiple axes in the robotic device may be performed or implemented using a communication line such as ETHERCAT.

Exemplary aspects of using EMI filters for robotic devices with multiple axes, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 2:
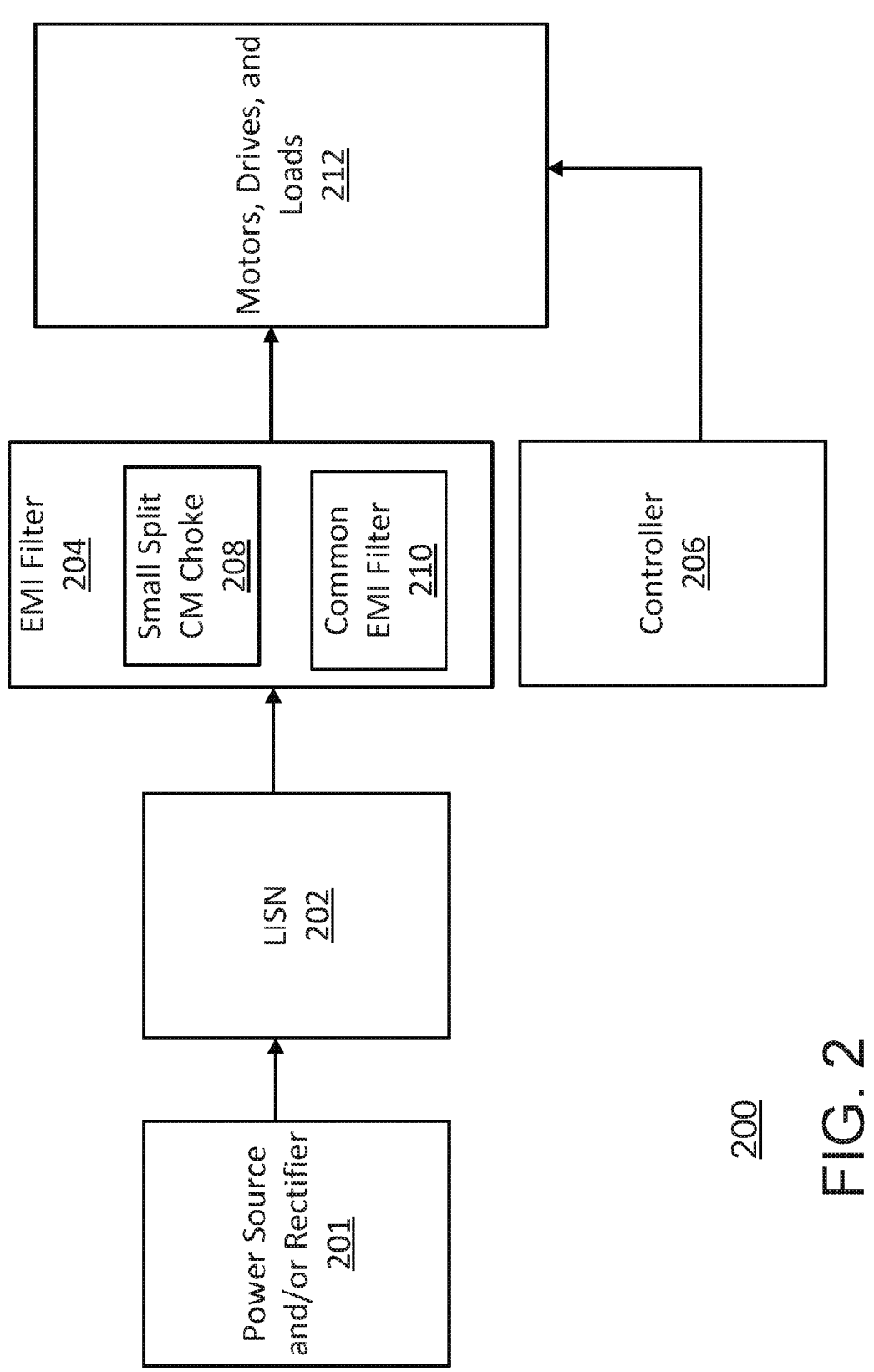
FIG. 2 is a schematic illustration of a block diagram depicting an exemplary robotic device with an EMI filter located prior to the motors and drives according to one or more embodiments of the present disclosure.

FIG. 2 is a schematic illustration of a block diagram depicting an exemplary robotic device 100 with an EMI filter 204 located prior to the motors, drives, and loads 212 according to one or more embodiments of the present disclosure.

Referring to FIG. 2, the robotic device 200 includes a power source and/or rectifier 201, a LISN 202, an EMI filter 204, a controller 206, and motors, drives, and loads 212. Although the entities within the robotic device 200 may be described below and/or depicted in the FIGS. as being singular entities, it will be appreciated that the entities and functionalities discussed herein may be implemented by and/or include one or more entities.

The power source and/or rectifier 201 is configured to provide energy (e.g., power, current, and/or voltage such as DC power, DC current, and/or DC voltage) to the LISN 202. The power source and/or rectifier 201 may be similar to and/or function similarly to the power source 102 and rectifier 104 shown in FIG. 1A. The LISN 202 is a device used in conducted and radiated radio-frequency emission and susceptibility tests and may be similar to the LISN 106 from FIG. 1A.

Further, unlike traditional systems (e.g., the prior art system described in FIGS. 1A-1D), the robotic device 200 includes an EMI filter 204 that is positioned and located between the LISN 202 and the motors, drives, and loads 212. In other words, the LISN 202 is coupled to or connects to the EMI filter 204 and then the EMI filter 204 is coupled to or connects to the motors, drives, and loads 212. The EMI filter 204 may include a small split CM choke 208 and/or a common EMI filter 210 (e.g., a bus filter). For instance, the robotic device 200 may attenuate the EMI noise to be within 150 kHz to 30 MHz by adding one common EMI filter 210 on a common DC bus and/or putting a split small common mode (CM) choke 208 on the DC terminal of each axis. As such, the present application is able to reduce the EMI in multiple axes by putting EMI filter 204 on the DC side (e.g., prior to the motors) because there is a common DC bus in the robotic device 200, a short DC cable among multiple axes, and a short AC cable between the drive and motor, which is integrated motor drive in each axis.

The robotic device 200 further includes a controller 206. The controller 206 is coupled to and/or connects to the motors, drives, and loads 212. For instance, the controller 206 may have a wired connection to the motors, drives, and loads 212. Additionally, and/or alternatively, the controller 206 may use wireless communications (e.g., a wireless communication protocol such as WI-FI, BLU-TOOTH, and so on) to communicate with the motors, drives, and loads 212. The controller 206 may provide instructions or commands to the motors, drives, and loads 212. Moreover, the controller 206 may use phase-shift switching control among the multiple axes to suppress and/or reduce the leakage current. For example, for a three-axis (e.g., x, y, and z-axis) robotic device, the controller 206 may synchronize the clock and perform phase-shift switching such that the drive of the first axis may provide power to the motor at zero degrees, the drive of the second axis may provide power to the motor at 120 degrees, and the drive of the third axis may provide power to the motor at 240 degrees. By using phase-shift switching control, there is a very low amount of leakage current from the multiple axes that goes back to the power earth (PE) terminal on the front-end rectifier power module side. Therefore, the safety of the robotic device 200 may be enhanced further. The synchronizing among the multiple axes of the robotic device 200 may be implemented by a communication line, such as ETHERCAT.

Figure 3:
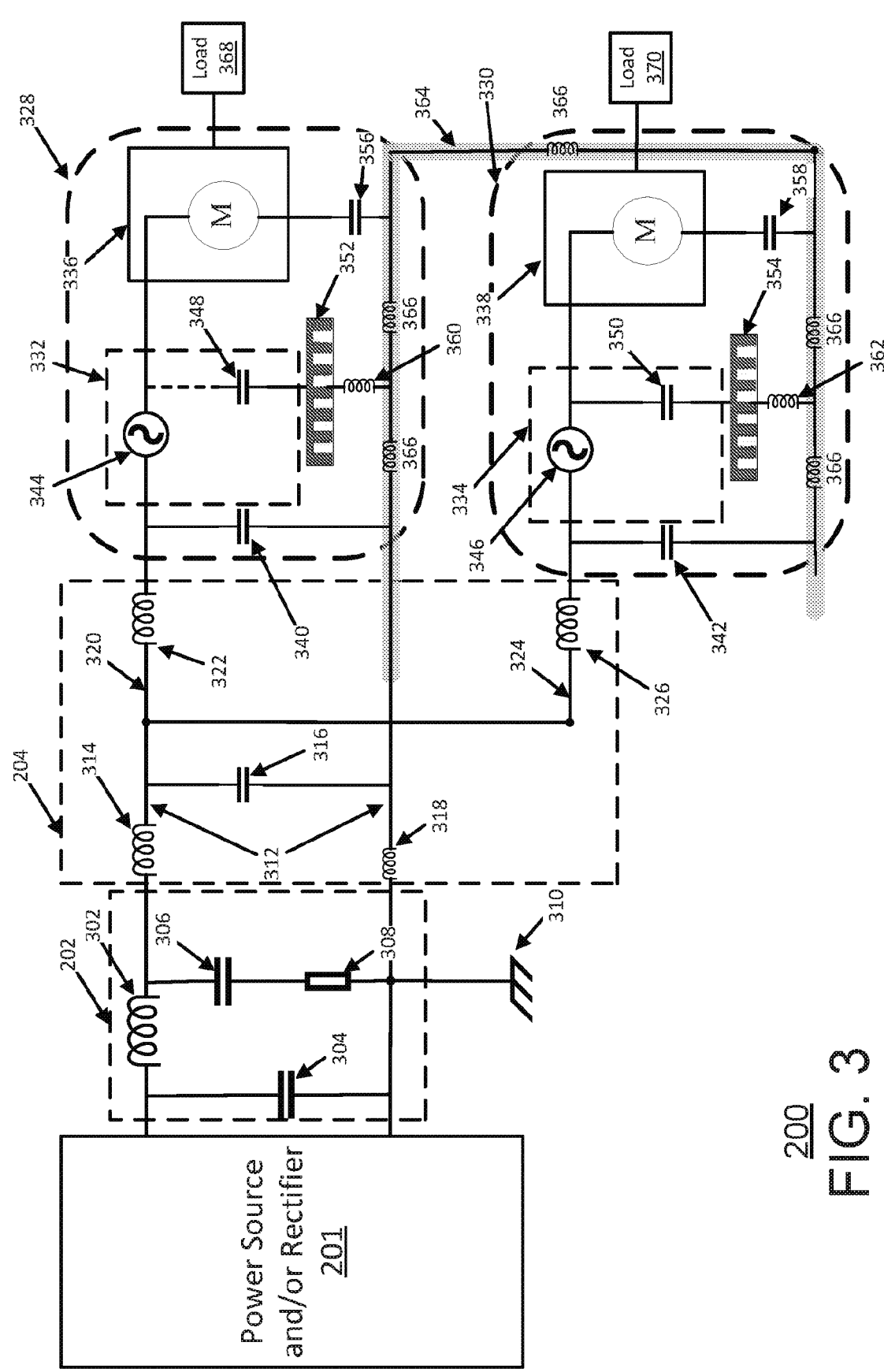
FIG. 3 illustrates a circuit and block diagram depicting the exemplary robotic device with the EMI filter of FIG. 2 according to one or more embodiments of the present disclosure.

FIG. 3 illustrates a circuit and block diagram depicting the exemplary robotic device 200 according to one or more embodiments of the present disclosure and will be used to further describe how the robotic device 200 reduces leakage current and EMI noise. Referring to FIG. 3, the power source and/or rectifier 201 is coupled to the LISN 202. Dotted lines are used for the LISN 202, the EMI filter 204, the drive 332, the drive 334, the first axis 328, and the second axis 330 to show the components within each of them. For example, the LISN 202 includes an inductor 302, two capacitors 304 and 306, and a resistor 308. The LISN 202 may be an equivalent circuit model to the LISN 106. The LISN 202 is connected to a power earth 310 (e.g., ground cable) as well as the EMI filter 204.

As shown in FIG. 2, the EMI filter 204 includes the small split common mode (CM) choke 208 and a common EMI filter 210. Referring now to FIG. 3, the common EMI filter 210 may include a CM choke (e.g., the inductor 314, which in some instances, may be around and/or less than 10 Milli-Henrys (mH)), an X capacitor (not shown in FIG. 3), and/or a Y capacitor (e.g., the Y capacitor 316) that is placed on the common DC bus (e.g., the bus 312). The common EMI filter 210 may further include an inductor 318 (e.g., a stray inductor). The CM choke 314 is an electrical filter that blocks may block noise such as EMI noise. For instance, the CM choke 314 may block high frequency noise while allowing the desired DC signal/energy to pass. X capacitors are connected between the DC+ line and DC− line to protect against differential mode interference. Y-capacitors (e.g., Y capacitor 316) are connected between a line and ground to protect against the common mode interference. The common EMI filter 210 (e.g., the inductor 314 and/or the capacitor 316) are located on the bus 312. In other words, unlike the bus 130 in the prior art systems shown in FIGS. 1A-1D, the bus 312 of the robotic device 200, which is between the LISN 202 and the axes 328, 330, has a CM choke 314, an X capacitor, and/or a Y capacitor that is/are configured to reduce the EMI and/or suppress the leakage current.

Additionally, and/or alternatively, the robotic device 200 may further include small split CM chokes 208 for each of the axes 328 and 330. For example, after the bus 312, the robotic device 200 includes a connection (e.g., a wire) that couples/connects the bus 312 to the different axes. For instance, the connection 320 couples the bus 312 to the first axis 328 and the connection 324 couples the bus 312 to the second axis 330. Each of the axes 328 and 330 also includes a small split CM choke 322 and 326, which in some examples, may be around or less than 500 nano-Henrys (nH). In other words, the small split CM choke 208 may include multiple small split CM chokes and each of the different axes of the robotic device 200 includes a different small split CM choke (e.g., 322 and 326). Only two axes 328 and 330 are shown for brevity and clarity, but as mentioned above, the robotic device 200 may include any number of axes such as a six-axis robotic device, twelve-axis robotic device, or a robotic device with even more axes. Each of the different axes within the robotic device 200 may have its own drive/motor combination. Accordingly, each of these different axes may further have its own small split CM choke. For instance, for a six-axis robotic device 200, the small split CM choke 208 may be six separate small split CM chokes. Each of these small split CM chokes may be on a different axis of the robotic device 200 and used to reduce the EMI noise and/or suppress the leakage current.

The first axis 328 of the robotic device 200 includes a drive 332 and a motor 336 and the second axis 330 includes a drive 334 and a motor 338. The drives 322 and 334 may be an equivalent circuit model to the drive 140 shown in FIG. 1B. Both axes 328 and 330 further includes a heatsink (e.g., heatsink 352 and 354). Further, the motors 336 and 338 are coupled to the loads 368 and 370. The functionality of the motors, loads, heatsink and drives are described above.

Within the axes 328 and 330, there includes capacitors 340, 342, 348, 350, 356, 358. The capacitors 340 and 342 are parasitic bus capacitors that are between the DC bus on each axis to power earth 310. The capacitors 348 and 350 show equivalent parasitic capacitance between the AC output capable in each axis and power earth 310. The capacitors 356 and 358 are equivalent parasitic motor capacitors between the chassis/frame of the motor drives (e.g., 332 and 334) in each axis and power earth 310. There are also two alternate voltage sources 344 and 346 that are equivalent models of the drive 144 from FIG. 1B. The motors 336 and 338 are equivalent motor models of motor 142 from FIG. 1B. There are also two inductors 360 and 362 (e.g., stray inductors) that are parasitic inductors between the heatsink 352/354 and the power earth 310.

The robotic device 200 further includes a frame 364, which is shaded similar to frame 160 in FIG. 1B. The frame 364 includes multiple inductors 366. The frame 364 and the inductors 366 may function similarly to the frame 160 and the inductors 166, which is described above.

In other words, the robotic device 200 shown on FIGS. 2 and 3 may reduce the EMI noise and/or suppress the leakage current by using the EMI filter 204, the controller 206 and/or other devices or components. For instance, the common EMI filter 210 may include a CM choke (e.g., the inductor 314), an X capacitor, and/or a Y capacitor (e.g., the Y capacitor 316) and is located on the bus (e.g., the bus 312). The Y capacitor may be placed before the split CM chokes on the bus (e.g., bus 312) to reduce the EMI noise and also to reduce the leakage current on the AC input side of the power factor correction (PFC) module. The PFC may be the power source and/or rectifier 201 and may include one point that is on the DC+/DC− lines and the other point that is power earth. The Y capacitor 316 may be an equivalent Y capacitor where it includes the Y-cap between the DC+ and the power earth 310 and the Y-Cap between the DC− and the power earth 310. Additionally, and/or alternatively, the robotic device 200 includes a small split CM choke (e.g., the CM choke 322 and 326) that directly connects to the DC terminal of the integrated motor drive (e.g., the input to motors 336 and 338) for each axis (e.g., axis 328 and 330), which helps reduce the leakage current on the motor side and EMI noise at the high frequency band. Additionally, and/or alternatively, the robotic device 200 includes a controller 206 that performs phase-shift switching control by synchronizing the clock among the multiple axes within the robotic device 200, which when applied, further reduces the EMI noise and/or the size of the EMI filter (e.g., the EMI filter 204 may be single staged rather than multi-staged). Additionally, and/or alternatively, the robotic device 200 includes a ground cable (e.g., the power earth 310) such that the multiple axes (e.g., axes 328 and 330) are connected to the power earth 310 at a single point. The power earth 310 may be located between the common EMI filter 210 and the split CM chokes 208 in the robotic device 200. In this way, the leakage current feedback to the AC input power source or rectifier is small and the system safety may be ensured.

It will be appreciated that the exemplary robotic device 200 depicted in FIGS. 2 and 3 is merely an example, and that the principles discussed herein may also be applicable to other devices—for example, including other types of robotic devices or systems with additional axes and/or loads.

Figure 4:
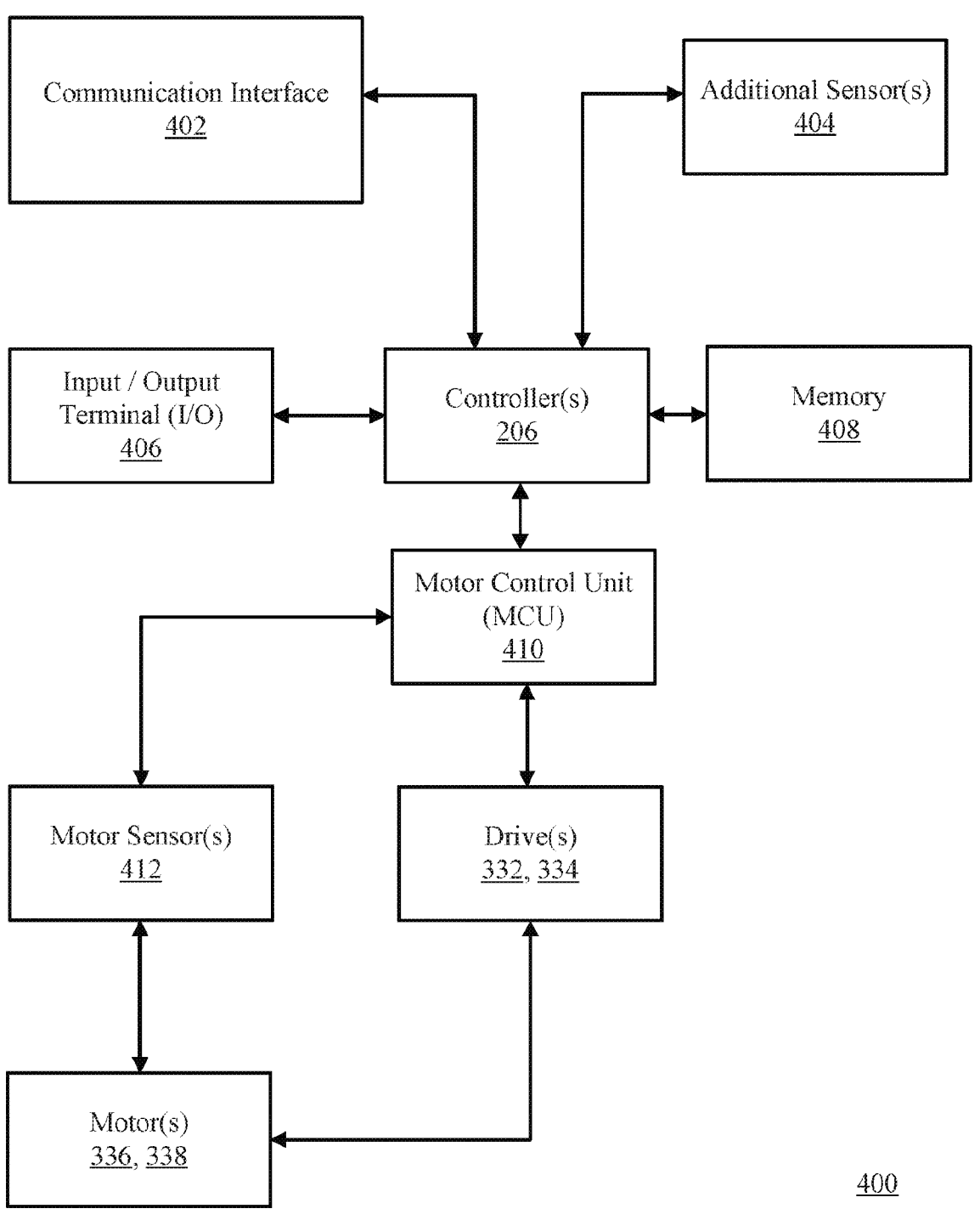
FIG. 4 is a schematic illustration of an exemplary control system of the robotic device of FIG. 2 according to one or more embodiments of the present disclosure.

FIG. 4 is a schematic illustration of an exemplary control system 400 of the robotic device 200 according to one or more embodiments of the present disclosure. It will be appreciated that the control system 400 shown in FIG. 4 is merely an example and additional/alternative embodiments of the control system 400 for the robotic device 200 are contemplated within the scope of the present disclosure.

The control system 400 includes a controller 206. The controller 206 is not constrained to any particular hardware, and the controller's configuration may be implemented by any kind of programming (e.g., embedded Linux) or hardware design—or a combination of both. For instance, the controller 206 may be formed by a single processor, such as general purpose processor with the corresponding software implementing the described control operations. On the other hand, the controller 206 may be implemented by a specialized hardware, such as an ASIC (Application-Specific Integrated Circuit), an FPGA (Field-Programmable Gate Array), a DSP (Digital Signal Processor), or the like. As described above, the controller 206 may provide information (e.g., instructions and/or commands) to synchronize the clock among the multiple axes of the robotic device 200 and/or control the phase-shift switching of the motors/drives of the robotic device 200.

The controller 206 is in electrical communication with memory 408. The memory 408 may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM), a ROM, an erasable programmable read-only memory (EPROM or Flash memory), a compact disc read-only memory (CD ROM), or other tangible optical or magnetic storage device. The memory 408 may store corresponding software such as computer-readable instructions (code, script, etc.). The computer instructions being such that, when executed by the controller 206, cause the controller 206 to control the control system 400 to reduce the EMI and/or suppress the leakage current as described herein.

The control system 400 may include input/output (I/O) devices 406 for receiving and/or providing various input and output. For example, the control system 400, via the I/O device 406, may receive external communications from a user and send external communications to the user.

The controller 206 may communicate with other devices within an environment or system using the communication interface 402. For example, the controller 206 may receive and provide information to other devices (e.g., other robotic devices) and/or users within the system or environment.

The control system 400 may further include a motor control unit (MCU) 410 (also referred to herein as a motor controller), e.g., as part of the controller 20 or a separate device. The MCU 410 controls motor drives 332 and 334 using feedback from motor sensors 412 (e.g., encoders) in order to provide real time control of the motors 336 and/or 338. Accordingly, the MCU 410 receives instructions for controlling the motors 336 and/or 338 (e.g., receives motor/actuator control signals from the controller 206), and interprets those instructions, in conjunction with feedback signals from the motor sensors 412, to provide control signals to the motor drives 332 and/or 334 for accurate and real-time control of the motors 336 and/or 338 (e.g., sends motor/actuator driver signals). The motor drives 332 and/or 334 transform the control signals, as communicated by the MCU 410, into drive signals for driving the motors 336 and/or 338 (e.g., sends individual operation signals to the motors/actuators). In some examples, the MCU 410 is integrated with circuitry to directly control the motors 336 and/or 338.

The MCU 410 may be included as part of the controller 206 or a stand-alone processing system (e.g., a microprocessor). Accordingly, just like the controller 206, the MCU 410 is not constrained to any particular hardware, and the MCU's configuration may be implemented by any kind of programming or hardware design—or a combination of both.

FIG. 5 illustrates a process 500 for reducing the EMI noise and suppressing the leakage current using the EMI filter 204 of the robotic device 200 according to one or more embodiments of the present disclosure. The process 500 may be performed by the robotic device 200 shown in FIGS. 2-4. However, it will be recognized that any of the following blocks may be performed in any suitable order and that the process 500 may be performed in any suitable robotic device.

At block 502, the robotic device (e.g., robotic device 200) uses an EMI filter (e.g., EMI filter 204) to reduce the EMI and/or suppress the leakage current within the robotic device. The EMI filter is located between a rectifier (e.g., the power source and/or rectifier 201) and a plurality of drives and motors (e.g., the drives and motors 332, 334, 336, and 338). Further, each of the plurality of drives and motors is associated with a different axis (e.g., the first axis 328 or the second axis 330).

At block 504, the robotic device uses a controller (e.g., controller 206) to control phase-shift switching of the plurality of drives and motors. The controller synchronizes a clock for the plurality of drives and motors associated with the different axes.

Results are provided below to verify the improvement of the robotic device 200 using the EMI filter 204, the controller 206, and/or the process 500 in reducing the EMI noise and/or suppressing the leakage current. In particular, the equivalent parasitic capacitors from the motor to the power earth was around 900 Pico Farads (pF) for each axis. The equivalent parasitic capacitors from the drives to the PE was around 150 Nano Farads (nF) in each axis where one gallium nitride (GaN) drive with 400 Volts (V)/up to 600 Watts (W) was applied. The switching frequency was 32 kHz. The EMI standards EN 55011 Group 1 Class A were used to evaluate the robotic device 200.

Further, different test conditions were provided to verify the present application, which is shown in Table 1 below. Given two axes for the robotic device 200, there may be a large amount of leakage current flow from the motor to the front-end rectifier power module and serious EMI noise in each axis without an EMI solution. When one common EMI filter with a CM choke inductor (e.g., inductor 314) and a Y capacitor (e.g., capacitor 316) is added, the leakage current to the front-end rectifier power module is significantly reduced, and the EMI noise is below the standard. By adding a small split common mode choke inductor (e.g., inductor 322 and/or 324) on the DC side of each axis (e.g., axis 328 and 330), the leakage current drops down by quite an amount. These small split common mode choke inductors (e.g., 322 and/or 324) further helps to reduce the EMI noise at higher frequency ranges (e.g., frequency ranges in the MHz). Furthermore, the leakage current is significantly decreased by enabling a 180 degree phase shift switching control on the two axes where the leakage current to front-end rectifier power module decreases from 8.5 mA to 0.2 mA. Moreover, the EMI noise is further reduced. This can be further seen in Table 1 below with a robotic device with three axes with different power/speed among the multiple axes.

TABLE 1

| | No. | LCM1 Milli Henry (mH) | CY1 Nano Farad (nF) | LCM2 Milli Henry (mH) | Motor leakage current (RMS) Milli Amps (mA) | Leakage current to front-end rectifier Power module (RMS) Milli Amps (mA) | CM noise (quasi peak) Decibel Micro Volt (dBµV) |
|---|---|---|---|---|---|---|---|
| 2 axis (in phase 450 W power for each axis) | 1 | / | / | / | 99 mA/97 mA | 220 mA | 118 dBµV@160 kHz |
| | 2 | 1.25 mH | 100 nF | / | 144 mA/142 mA | 8.9 mA | 70 dBµV@160 kHz |
| | 3 | 1.25 mH | 100 nF | 0.1 mH × 2 | 88 mA/88 mA | 8.5 mA | 71 dBµV@160 kHz |
| 2 axis (180° phase shift, 450 W power for each axis) | 4 | 1.25 mH | 100 nF | 0.1 mH × 2 | 89 mA/89 mA | 0.2 mA | 57 dBµV@194 kHz |

TABLE 1-continued

| No. | LCM1 Milli Henry (mH) | CY1 Nano Farad (nF) | LCM2 Milli Henry (mH) | Motor leakage current (RMS) Milli Amps (mA) | Leakage current to front-end rectifier Power module (RMS) Milli Amps (mA) | CM noise (quasi peak) Decibel Micro Volt (dBµV) |
|---|---|---|---|---|---|---|
| 3 axis (In phase, 450 W power for each axis) | | | | | | |
| 5 | / | / | / | 95 mA | 293 mA | 121 dBµV@160 kHz |
| 6 | 1.25 mH | 100 nF | 0.1 mH × 2 | 88/88/88 mA | 12.6 mA | 74 dBµV@160 kHz |
| 3 axis (120° phase shift, 450 W power for each axis) | | | | | | |
| 7 | 1.25 mH | 100 nF | 0.1 mH × 2 | 89/89/89 mA | 1.2 mA | 60 dBµV@194 kHz |
| 2 axis (in phase, 100 W for one axis, 450 W for another axis) | | | | | | |
| 8 | 1.25 mH | 100 nF | 0.1 mH × 2 | 100 mA/89 mA | 8.5 mA | 74 dBµV@160 kHz |
| 2 axis (180° phase shift, 100 W for one axis, 450 W for another axis) | | | | | | |
| 9 | 1.25 mH | 100 nF | 0.1 mH × 2 | 100 mA/89 mA | 0.3 mA | 63 dBµV@160 kHz |
| 2 axis (in phase, 450 W for each axis, 200 Hz output for one axis, 600 Hz output for the other axis) | | | | | | |
| 10 | 1.25 mH | 100 nF | 0.1 mH × 2 | 89 mA/86 mA | 8.4 mA | 71 dBµV@160 kHz |
| 2 axis (180° phase shift, 450 W for each axis, 200 Hz output for one axis, 600 Hz output for the other axis) | | | | | | |
| 11 | 1.25 mH | 100 nF | 0.1 mH × 2 | 89 mA/87 mA | 0.2 mA | 50 dBµV@160 kHz |

Among other advantages, high voltage applications are feasible for the robotic device with distributed motor drives using the EMI and leakage current suppression techniques, processes, and devices described above. Further, the high switching devices may be used to improve power density and efficiency, high switching frequency may be implemented to reduce current ripple and torque ripple, optimized EMI filter sizes and configuration may reduce the cost and space requirement within the robotic device, it may reduce the burden on front-end rectifier power module to suppress the leakage current, it may reduce the leakage current on the motor side, which helps to enhance the lifetime of the motor, simple phase-shift switching control assists to reduce both EMI noise and leakage current, and/or the EMI filters may be placed on the DC side and no AC EMI filter may be required on the motor side. An advantage of not having an EMI filter on the AC side may be that the AC EMI filter is typically larger than the DC EMI filter. This is especially true on the AC motor side as the AC EMI filter may have to be a three phase EMI filter to account for all three phases of the drive as well as to account for the high current through the EMI filter. On the DC side, the DC EMI filter may include one EMI filter with a lower current threshold.

The present application describes a robotic device that may include an integrated motor drive for each axis. Additionally, and/or alternatively, the robotic device may have an integrated motor drive, one or more common EMI filters to be located on the bus (e.g., DC bus), which includes one or more common mode chokes and/or Y capacitors (e.g., two Y capacitors), one or more split common mode choke that is located on the DC side for each axis, a power earth cable from each axis that is connected at a single point prior to the EMI filter, interleaved switching control that is used for multiple axes of operation, and/or switching clock among the multiple axes of the robotic device that is synchronized by a communication line such as ETHERCAT.

Figure 6:
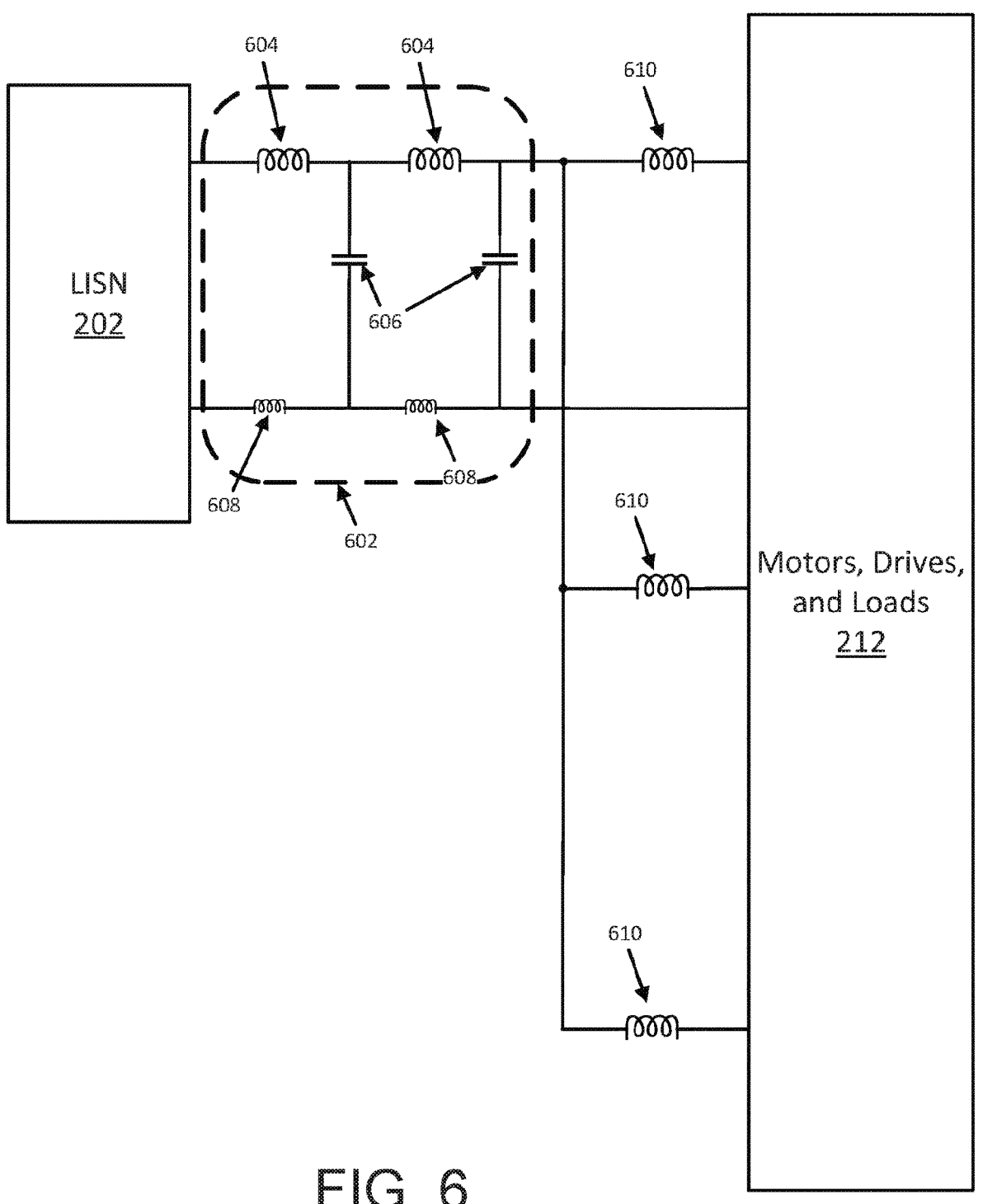
FIGS. 6-8 illustrate additional and/or alternative examples of the EMI filter for reducing the EMI and/or suppressing the leakage current according to one or more embodiments of the present disclosure.
Figure 7:
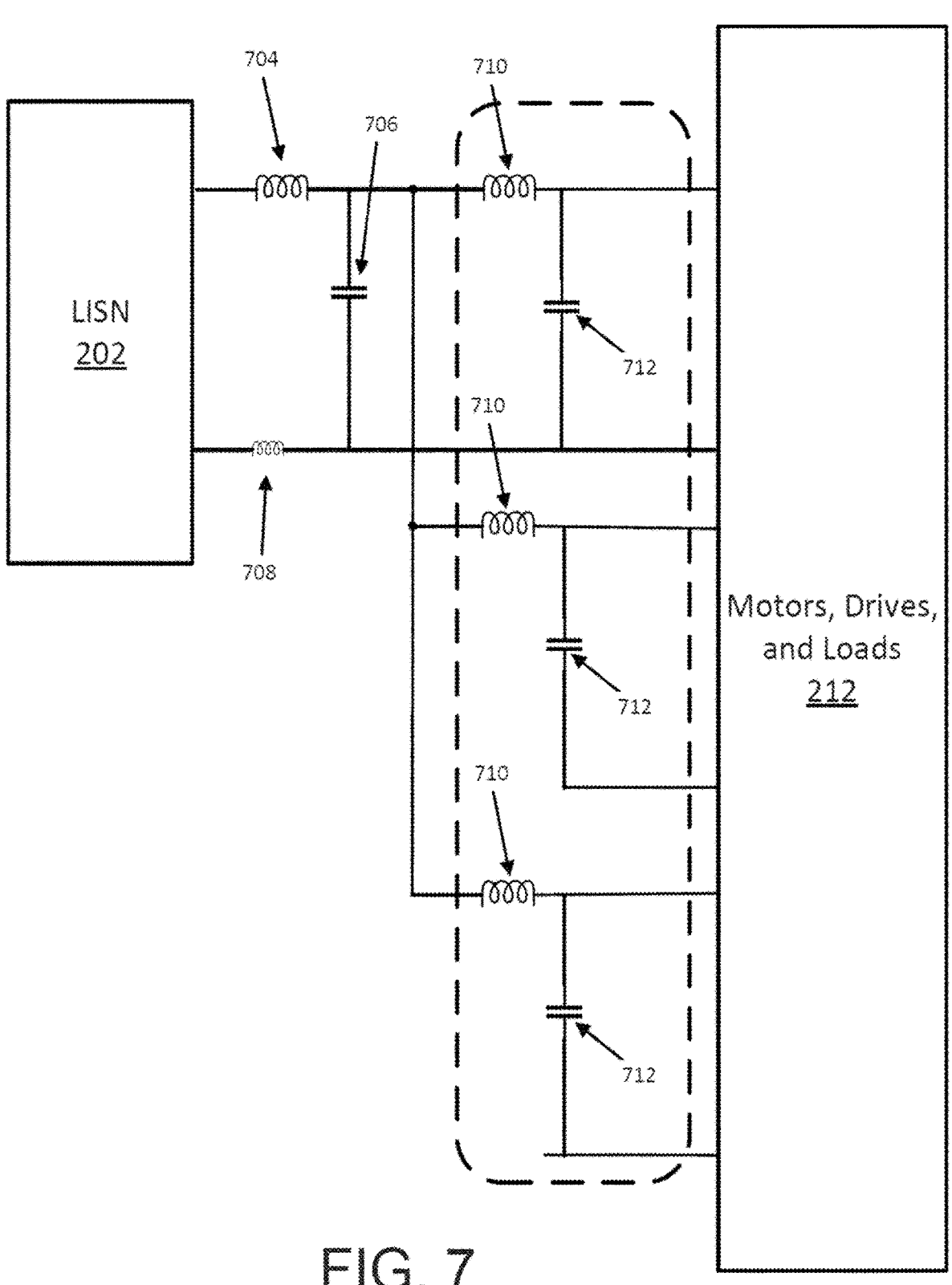
Figure 8:
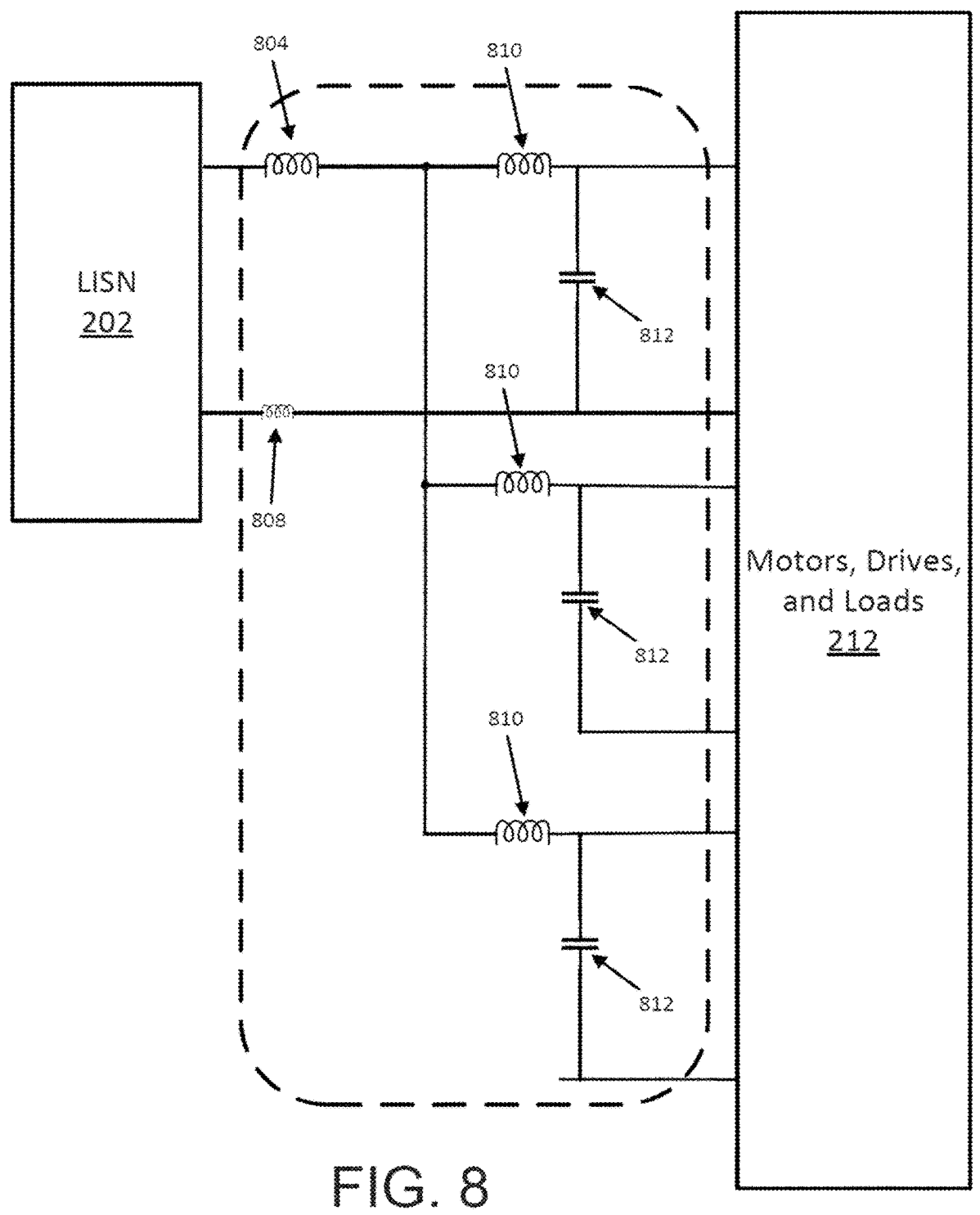

FIGS. 6-8 illustrate additional and/or alternative examples of the EMI filter for reducing the EMI and/or suppressing the leakage current according to one or more embodiments of the present disclosure. For example, FIG. 6 shows a two-stage filter that is positioned between the LISN 202 and the motors, drives, and loads 212. For instance, the two stage filter 602 is located on the bus (e.g., 312) prior to the individual connections to the motors, drives, and loads 212. The two stage filter 602 may include two Y capacitors 606, two small split chokes 604 (e.g., two inductors), and two further inductors 608 (e.g., stray inductors). In other words, the common EMI filter 210 may be a two stage filter. Further, the robotic device 200 may include the common EMI filter 210 as well as the small split chokes 208. For instance, as shown, the small split chokes 208 are shown as inductors 610. In some variations, the robotic device 200 may just include the two-stage filter 602 (e.g., without the small split chokes 610).

FIG. 7 shows the small split CM choke 208 being enhanced by using a small CM choke and one or more small Y capacitors (e.g., two Y capacitors). For instance, for each axis of the robotic device (e.g., on the connection 320 and/or 324), the robotic device 200 may include a small CM choke with two small Y capacitors. As shown, the robotic device may include the common EMI filter 210 (e.g., the small split CM choke 704, the stray inductor 708, and the Y capacitor 706 on the bus of the robotic device). For each of the individual connections to the different motors, drives, and loads 212, the robotic device 200 may include the small split CM choke 208 (as shown as the inductors 710). Further, the robotic device 200 may also include one or more small Y capacitors 712 that are used to further reduce the leakage current and/or EMI noise.

FIG. 8 shows another embodiment where the Y capacitor within the EMI common filter 210 is replaced by one or more small Y capacitors in each axis. For example, the Y capacitors (e.g., capacitor 316) in the common one stage EMI filter 210 may be replaced by two small Y capacitors on each axis before the split CM choke. As shown, the robotic device may include the common EMI filter 210 without the Y capacitor (e.g., the small split CM choke 804 and the stray inductor 808 on the bus of the robotic device). For each of the individual connections to the different motors, drives, and loads 212, the robotic device 200 may include the small split CM choke 208 (as shown as the inductors 810). Further, the robotic device 200 may also include one or more small Y capacitors 812 that are used to further reduce the leakage current and/or EMI noise.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A robotic device, comprising:
a controller configured to control phase-shift switching of a plurality of axes to reduce electromagnetic interference (EMI) noise and suppress leakage current;
an electrical circuit, comprising:
    a power source and rectifier that are configured to provide energy to the plurality of axes of the robotic device, wherein each of the plurality of axes includes a motor and a drive that is configured to operate a load, and wherein the power source and the rectifier are electrically coupled to an EMI filter;
    the EMI filter, wherein the EMI filter is configured to further reduce the EMI noise and suppress the leakage current from the plurality of axes, and wherein the EMI filter is electrically coupled to the plurality of axes such that the EMI filter is between the rectifier and the plurality of axes, wherein the EMI filter comprises a plurality of small split common mode chokes, wherein each of the plurality of small split common mode chokes is associated with a different axis of the plurality of axes, and wherein the small split common mode chokes comprise an inductance less than 500 nano-Henrys; and
    the plurality of axes comprising a plurality of drives and a plurality of motors that are configured to operate a plurality of loads; and the plurality of loads coupled to the plurality of motors of the plurality of axes, wherein each of the plurality of loads maneuvers the robotic device in a different rotational or linear direction.

2. The robotic device of claim 1, further comprising:
an electrical bus electrically coupled to the power source and the rectifier; and
a plurality of individual connections that electrically couples the electrical bus to the plurality of axes, wherein each of the plurality of individual connections electrically couples
the electrical bus to a different axis of the plurality of axes, wherein each of the plurality of small split common mode chokes is positioned on a different individual connection of the plurality of individual connections.

3. The robotic device of claim 2, wherein the EMI filter further comprises a bus filter, wherein the bus filter is positioned on the electrical bus.

4. The robotic device of claim 3, wherein the bus filter comprises a second small split common mode choke and one or more Y capacitors.

5. The robotic device of claim 4, wherein the bus filter further comprises one or more X capacitors.

6. The robotic device of claim 3, wherein the bus filter is a multi-stage EMI filter that comprises a common EMI filter at a first stage and at least one small common mode choke at a second stage.

7. The robotic device of claim 1, wherein the EMI filter further comprises a plurality of Y capacitors, wherein a subset of the plurality of Y capacitors is associated with a different axis of the plurality of axes.

8. The robotic device of claim 7, wherein the subset of the plurality of Y capacitors is electrically coupled to a small split common mode choke, of the plurality of small split common mode chokes, and
    wherein the small split common mode choke is electrically coupled to a first axis, of
    the plurality of axes such that the small split common mode choke is in-between the subset of
    the plurality of Y capacitors and the first axis.

9. The robotic device of claim 1, wherein the controller is further configured to synchronize clocks for the plurality of axes.

10. The robotic device of claim 1, further comprising:

a power earth, wherein the plurality of axes are connected to the power earth at a single point.

11. The robotic device of claim 1, wherein the power source is an alternative current (AC) power source and the rectifier converts AC energy from the power source to DC energy, and wherein the EMI filter is configured to receive the DC energy from the rectifier and provide the DC energy to the plurality of axes.

12. An electrical circuit, comprising:

a power source and rectifier that are configured to provide energy to a plurality of axes, wherein each of the plurality of axes includes a motor and a drive that is configured to operate a load, and wherein the power source and the rectifier are electrically coupled to an electromagnetic interference (EMI) filter;

the EMI filter, wherein the EMI filter is configured to reduce EMI noise and suppress leakage current from the plurality of axes, and wherein the EMI filter is electrically coupled to the plurality of axes such that the EMI filter is between the rectifier and the plurality of axes, wherein the EMI filter comprises a plurality of small split common mode chokes, wherein each of the plurality of small split common mode chokes is associated with a different axis of the plurality of axes, and wherein the small split common mode chokes comprise an inductance less than 500 nano-Henrys; and the plurality of axes comprising a plurality of drives and a plurality of motors that are configured to operate a plurality of loads, wherein a controller is configured to control phase-shift switching of the plurality of axes to further reduce the EMI noise and suppress the leakage current.

13. The electrical circuit of claim 12, further comprising:

an electrical bus electrically coupled to the power source and the rectifier; and a plurality of individual connections that electrically couples the electrical bus to the plurality of axes, wherein each of the plurality of individual connections electrically couples the electrical bus to a different axis of the plurality of axes, wherein each of the plurality of small split common mode chokes is positioned on a different individual connection of the plurality of individual connections.

14. The electrical circuit of claim 13, wherein the EMI filter further comprises a bus filter, wherein the bus filter is positioned on the electrical bus.

15. The electrical circuit of claim 14, wherein the bus filter comprises a second small split common mode choke and one or more Y capacitors.

16. The electrical circuit of claim 15, wherein the bus filter further comprises one or more X capacitors.

17. The electrical circuit of claim 12, wherein the EMI filter further comprises a plurality of Y capacitors, wherein a subset of the plurality of Y capacitors is associated with the different axis of the plurality of axes.

18. A method, comprising:

controlling, by a controller of a robotic device, phase-shift switching of a plurality of axes to reduce electromagnetic interference (EMI) noise and suppress leakage current; and using, by an electrical circuit of the robotic device, an EMI filter to further reduce the EMI noise and suppress the leakage current from the plurality of axes, wherein the electrical circuit comprises a power source, a rectifier, the EMI filter, and the plurality of axes, wherein the EMI filter is electrically coupled to the plurality of axes such that the EMI filter is between the rectifier and the plurality of axes, wherein the EMI filter comprises a plurality of small split common mode chokes, wherein each of the plurality of small split common mode chokes is associated with a different axis of the plurality of axes, and wherein the small split common mode chokes comprise an inductance less than 500 nano-Henrys.

* * * * *